United States Patent
Mehta et al.

(10) Patent No.: US 9,177,005 B2
(45) Date of Patent: Nov. 3, 2015

(54) RESOLVING IN-MEMORY FOREIGN KEYS IN TRANSMITTED DATA PACKETS FROM SINGLE-PARENT HIERARCHIES

(71) Applicant: ORACLE INTERNATIONAL CORPORATION, Redwood Shores, CA (US)

(72) Inventors: Dhaval Manharlal Mehta, Belmont, CA (US); Jianying Huang, Rocklin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 298 days.

(21) Appl. No.: 13/754,341

(22) Filed: Jan. 30, 2013

(65) Prior Publication Data
US 2014/0214902 A1 Jul. 31, 2014

(51) Int. Cl.
*G06F 17/30* (2006.01)

(52) U.S. Cl.
CPC .... *G06F 17/30339* (2013.01); *G06F 17/30923* (2013.01)

(58) Field of Classification Search
CPC ................................................ G06F 17/30923
USPC ................................................ 707/755, 778
See application file for complete search history.

(56) References Cited

U.S. PATENT DOCUMENTS

| 6,850,951 | B1* | 2/2005 | Davison ....................... 707/792 |
| 7,861,251 | B2 | 12/2010 | Harvey et al. |
| 8,140,588 | B2 | 3/2012 | Salo et al. |
| 2002/0194163 | A1* | 12/2002 | Hopeman et al. ................. 707/3 |
| 2003/0204511 | A1* | 10/2003 | Brundage et al. ............. 707/100 |
| 2009/0276409 | A1 | 11/2009 | Young |
| 2012/0158725 | A1* | 6/2012 | Molloy et al. ................ 707/737 |

OTHER PUBLICATIONS

Author Unknown, "XML-Managing Data Exchange/The many-to-many relationship," 2011. Retrieved from http://en.wikibooks.org/wiki/XML_-_Managing_Data_Exchange/The_many-to-many_relationship#ID.2FIDREF.

Williams, K., "XML for Data: Modeling many-to-many relationships," IBM developerWorks, 2002. Retrieved from http://www.ibm.com/developerworks/xml/library/x-xdm2m.html.

DeRose, S., Eve Maier, and David Orchard, eds., "XML Linking Language (XLink) Version 1.0 W3C Recommendation," Jun. 27, 2001. Retrieved from http://www.w3.org/TR//.

* cited by examiner

*Primary Examiner* — Cheyne D Ly
(74) *Attorney, Agent, or Firm* — Kilpatrick Townsend & Stockton LLP

(57) ABSTRACT

A method of creating multi-parent relationships from single-parent data may include receiving a data set that includes a plurality of objects organized in a hierarchy. The method may also include parsing the data set to locate at least two objects in the plurality of objects. Each of the at least two objects may be associated with an identifier. The method may additionally include creating a data record to represent information associated with the at least two objects. The data record may be associated with a plurality of parent data records.

20 Claims, 12 Drawing Sheets

Register Organization

Org Info:
- Name: ACME Corp.
- Address: 123 Peach St, Cupertino, CA 94606

Contact Person:
- Name: Alex Lifeson
- Address: --
- [X] Same as Org — 610

Account Info:
- Number: 55432-22345
- Name: ACME Payables
- Account Contact: Alex Lifeson
- [X] Same as Org — 612

[Prev] [Next] — 614

602 — Org Info
604 — Contact Person
608 — Account Info
600

FIG. 6

```
<Organization>
    <Name>ACME Corp.</Name>
    <Phone>555-555-1234</Phone>
    <Address>
        <Street>123 Peach Street</Street>
        <City>Cupertino</City>
        <State>CA</State>
        <ZIP>94606</ZIP>
    </Address>
    <Contact>
        <Name>Alex Lifeson</Name>
        <Address>
            <Street>123 Peach Street</Street>
            <City>Cupertino</City>
            <State>CA</State>
            <ZIP>94606</ZIP>
        </Address>
    </Contact>
    <Account>
        <Number>55432-22345</Number>
        <Name>ACME Payables</Name>
        <Contact>
            <Name>Alex Lifeson</Name>
            <Address>
                <Street>123 Peach Street</Street>
                <City>Cupertino</City>
                <State>CA</State>
                <ZIP>94606</ZIP>
            </Address>
        </Contact>
    </Account>
</Organization>
```

FIG. 7

RESOLVING IN-MEMORY FOREIGN KEYS IN TRANSMITTED DATA PACKETS FROM SINGLE-PARENT HIERARCHIES

BACKGROUND

Managing large businesses may involve storing, aggregating, and analyzing large amounts of data. Many organizations use Enterprise Software Systems to manage almost every form of business data. For example, Enterprise Software Systems can provide business-oriented tools such as online shopping and online payment processing, interactive product catalogs, automated billing systems, security, enterprise content management, IT service management, customer relationship management, enterprise resource planning, business intelligence, project management, collaboration, human resource management, manufacturing, enterprise application integration, and Enterprise forms automation.

Enterprise Software Systems can integrate internal and external management information across an entire organization. Enterprise Software Systems may be used to automate activities between these different resources within an integrated software application. One purpose may be to facilitate the flow of information between business functions across boundaries of an organization, and to manage the connections between outside stakeholders and internal resources.

BRIEF SUMMARY

In one embodiment, a method of creating multi-parent relationships from single-parent data may be presented. The method may include receiving a data set that includes a plurality of objects organized in a hierarchy. The method may also include parsing the data set to locate at least two objects in the plurality of objects. Each of the at least two objects may be associated with an identifier. The method may additionally include creating a data record to represent information associated with the at least two objects. The data record may be associated with a plurality of parent data records.

In some embodiments, the method may also include ascertaining that the plurality of objects includes a first object, a second object that is associated with the identifier and is a child of the first object according to the hierarchy, a third object, and a fourth object that is associated with the identifier and is a child of the third object according to the hierarchy. The method may additionally include ascertaining, based on the identifier, that the second object and the fourth object represent the same information. The method may further include creating a second data record from the second object. The method may also include creating a first data record from the first object where the first data record may reference the second data record as a child record, and creating a third data record from the third object where the third data record may reference the second data record as a child record.

In some embodiments, the method may also include discarding the fourth object without requiring a corresponding fourth data record to be created. Information represented by the second object may be different than information represented by the fourth object. Information represented by the fourth object may be empty. The hierarchy may comprise a single-parent hierarchy. The data record may be part of a plurality of data records created from the plurality of objects, and the plurality of data records may be arranged in a multi-parent hierarchy. The data set may comprise an XML format. The identifier may comprise a value associated with an XML element. The data record may be part of a plurality of data records created from the plurality of objects, and each of the plurality of data records may comprise an entry in one or more relational databases. The data set may be received by an application that is a part of a suite of Enterprise Software Suite (ESS) applications, the data set may be sent from a client system that is part of the ESS, and the ESS may comprise a financial application, a human resource application, and an access manager. The data record may be referenced by a foreign key in each of the plurality of parent data records. The data set may include information related to an organization, contact information, account information, and/or an address.

In another embodiment, a computer-readable memory may be presented. Then computer-readable memory may have stored thereon a sequence of instructions which, when executed by one or more processors, causes the one or more processors to create multi-parent relationships from single-parent data. The instructions may cause the processor(s) to receive a data set that includes a plurality of objects organized in a hierarchy. The instructions may also cause the processor(s) to parse the data set to locate at least two objects in the plurality of objects. Each of the at least two objects may be associated with an identifier. The instructions may additionally cause the processor(s) to create a data record to represent information associated with the at least two objects. The data record may be associated with a plurality of parent data records.

In yet another embodiment, a system may be presented. The system may include one or more processors and a memory communicatively coupled with and readable by the one or more processors. The memory may have stored therein a sequence of instructions which, when executed by the one or more processors, cause the one or more processors to create multi-parent relationships from single-parent data. The instructions may cause the processor(s) to receive a data set that includes a plurality of objects organized in a hierarchy. The instructions may also cause the processor(s) to parse the data set to locate at least two objects in the plurality of objects. Each of the at least two objects may be associated with an identifier. The instructions may additionally cause the processor(s) to create a data record to represent information associated with the at least two objects. The data record may be associated with a plurality of parent data records.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6 illustrates an interface for receiving hierarchical data, according to one embodiment.

FIG. 7 illustrates an exemplary single-parent data representation, according to one embodiment.

DETAILED DESCRIPTION

Figure 1:
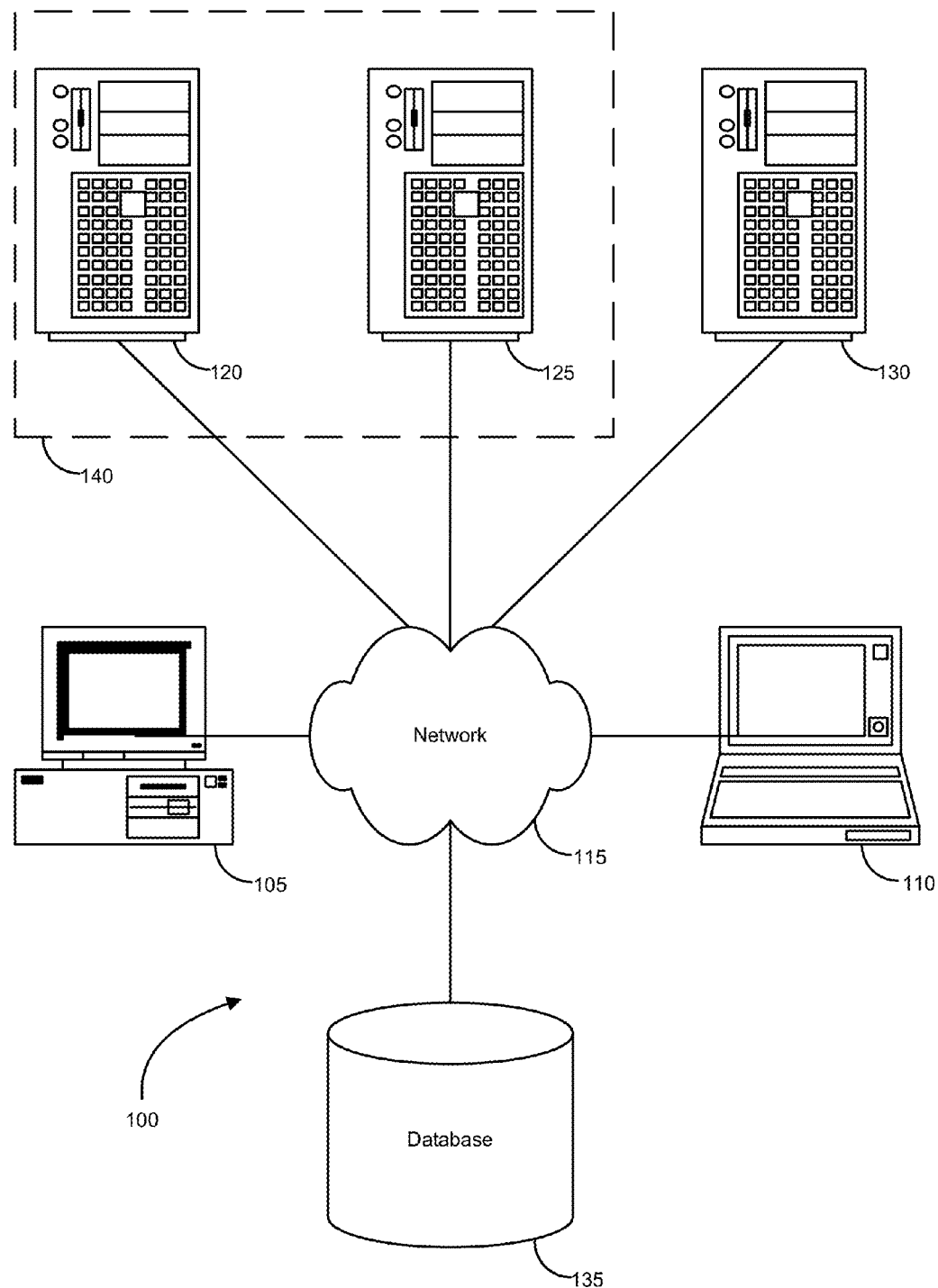
FIG. 1 illustrates a block diagram of components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Described herein, are embodiments for processing data sets with different formats. In some embodiments, an input data set may be provided in a format that does not support multi-parent hierarchies. However, the data set may be better represented using a multi-parent hierarchy than a single-parent hierarchy. For example, an XML formatted file only supports a single-parent hierarchy of objects. In other words, it is not possible to embed a single object in multiple parent objects in the XML file. The single-parent hierarchy data sets are often received by a server, parsed, and then stored as information in a format that does support multi-parent hierarchies, such as a relational database. Prior to this disclosure, an XML file received by a server from a client system was simply parsed by the receiving server. Any object found in the XML was automatically created as a data record and stored in a relational database. This led to duplication of data, as well as prolonged processing time.

The embodiments described herein can automatically or manually insert an identifier into the single-parent hierarchy for objects representing the same and/or similar data that should result in a single data record in a multi-parent hierarchy. A data conversion engine can then parse the received data set, identify objects associated the identifier, and create fewer data records as a result. The resulting data records may have multiple parents in the new hierarchy.

According to some embodiments, many benefits may be achieved. First, data duplication may be reduced, and payload size may consequently become smaller. Second, multi-parent hierarchies can be represented in data sets that normally would not allow for such. For example, prior to this disclosure, a client device would need to make multiple web service calls in order to create a multi-parent hierarchy. The first call would create one parent, such as a contact. The second call would create a child object along with the second parent, such as an account (second parent) and an account contact (child of both parents). The embodiments discussed herein allow the client to create a multi-parent child in a single call. For example, the contact, account, and account contact could all be part of the single call.

Each of the embodiments disclosed herein may be implemented in a computer system. FIG. 1 is a block diagram illustrating components of an exemplary operating environment in which various embodiments of the present invention may be implemented. The system 100 can include one or more user computers 105, 110, which may be used to operate a client, whether a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may be any type of network familiar to those skilled in the art that can support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
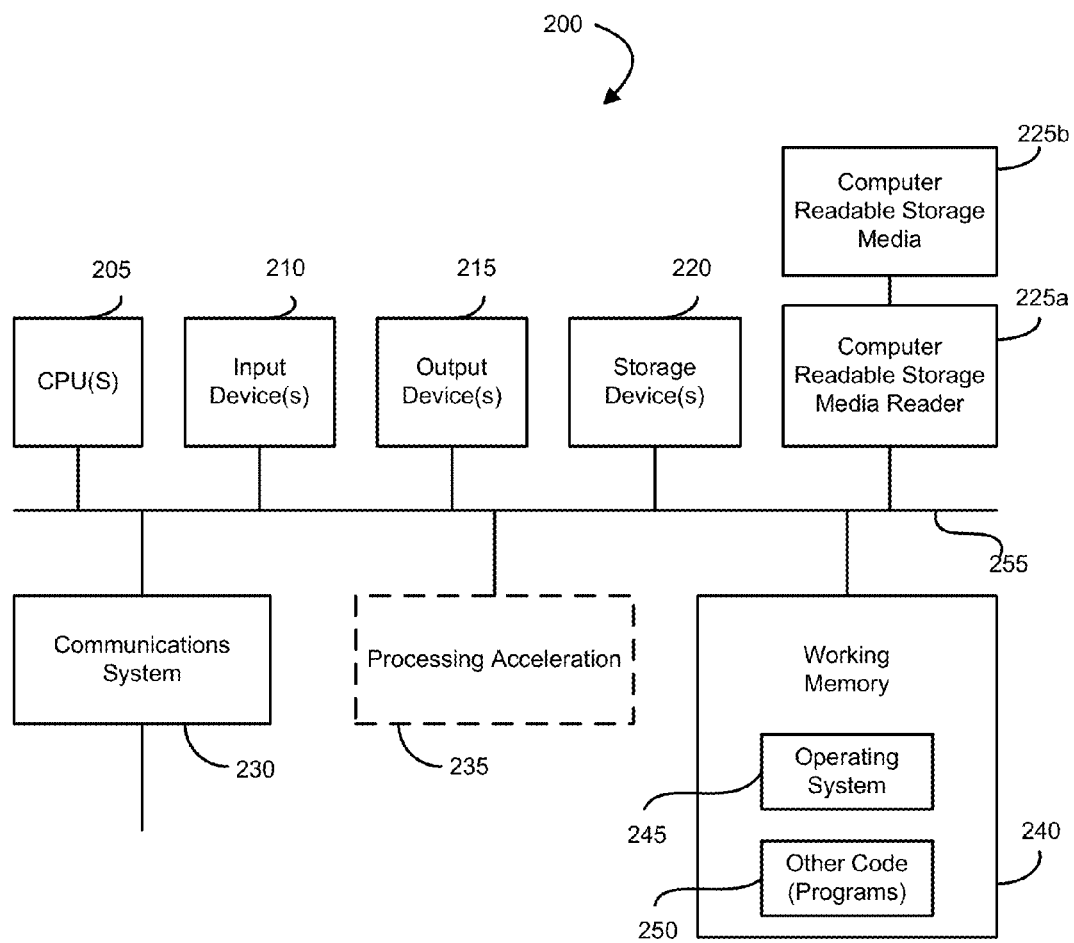
FIG. 2 illustrates a block diagram of an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Each of the methods described herein may be implemented by a computer system, such as computer system 200 in FIG. 2. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Therefore, it will be understood in light of this disclosure, that each step and each method described herein may be altered to include an input and output to and from a user, or may be done automatically by a computer system. Furthermore, some embodiments of each of the methods described herein may be implemented as a set of instructions stored on a tangible, non-transitory storage medium to form a tangible software product.

Figure 3:
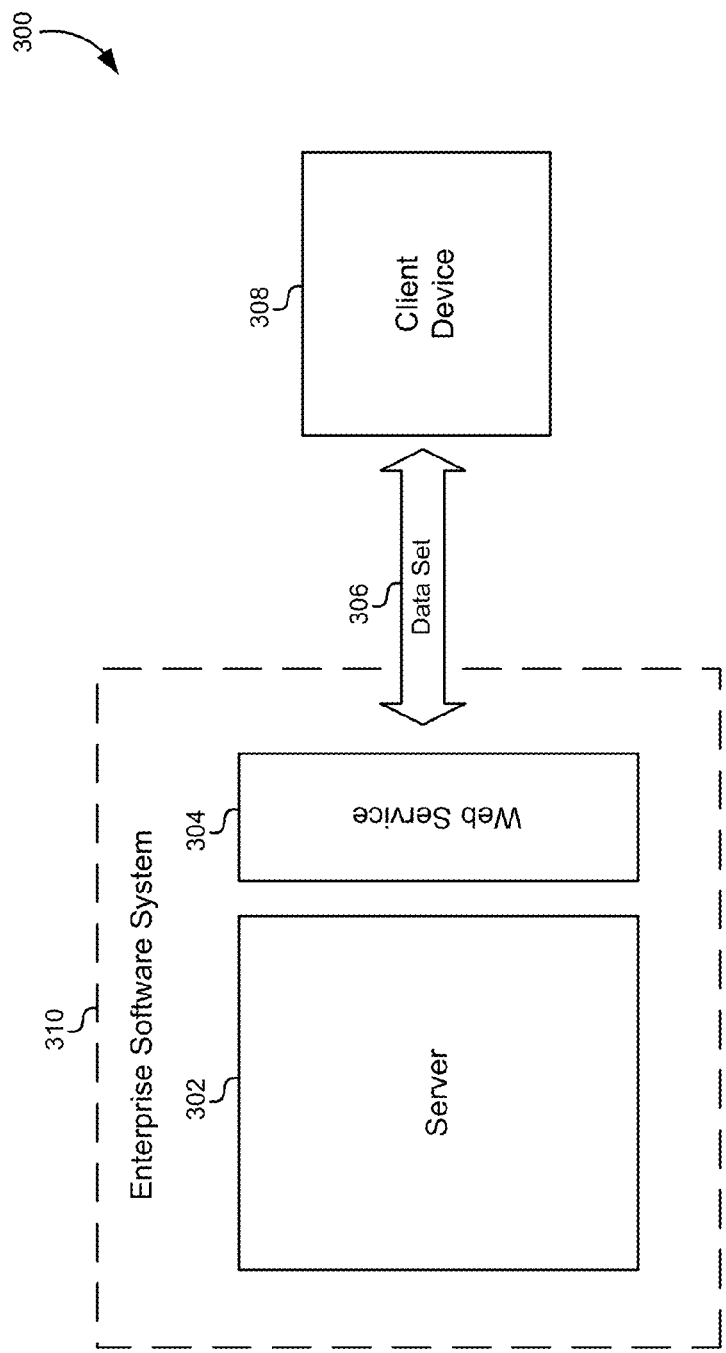
FIG. 3 illustrates a block diagram of a system for transforming data hierarchies, according to one embodiment.

FIG. 3 illustrates a block diagram of a system 300 for transforming data hierarchies, according to one embodiment. Generally, the system 300 may include two computer systems. Merely by way of example, a first computer system may comprise an Enterprise Software System 310. The Enterprise Software System 310 may include numerous subsystems, such as a server 302 and a web service interface 304. The web service interface 304 may be provided to supply data as well as receive data from other computer systems. For example, a data set 306 may be provided to the web service interface 304 and/or provided to another computer system. In other embodiments, the Enterprise Software System 310 may operate without the web service interface 304. The data set 306 provided to the web service interface 304 may be provided to the server 302 for storage and/or data processing.

The second computer system may comprise a client device 308. The client device 308 may include a personal computer, a laptop computer, a server, a router, a gateway, a notebook computer, a tablet computer, a smart phone, a personal data assistant, a thin client, a workstation, and/or any other type of computer system. In one embodiment, the client device 308 may be part of a separate Enterprise Software System. In another embodiment (not shown) the client device 308 may be a computer system that is part of the Enterprise Software System 310 of which the first computer system is also a part.

The first computer system and the second computer system, e.g. the server 302 and the client device 308, may communicate with each other through a wired or wireless connection, such as a local area network, a wide area network, the Internet, and/or the like. In one embodiment, the data set 306 may be formatted according to specifications provided by the web service interface 304.

Figure 4:
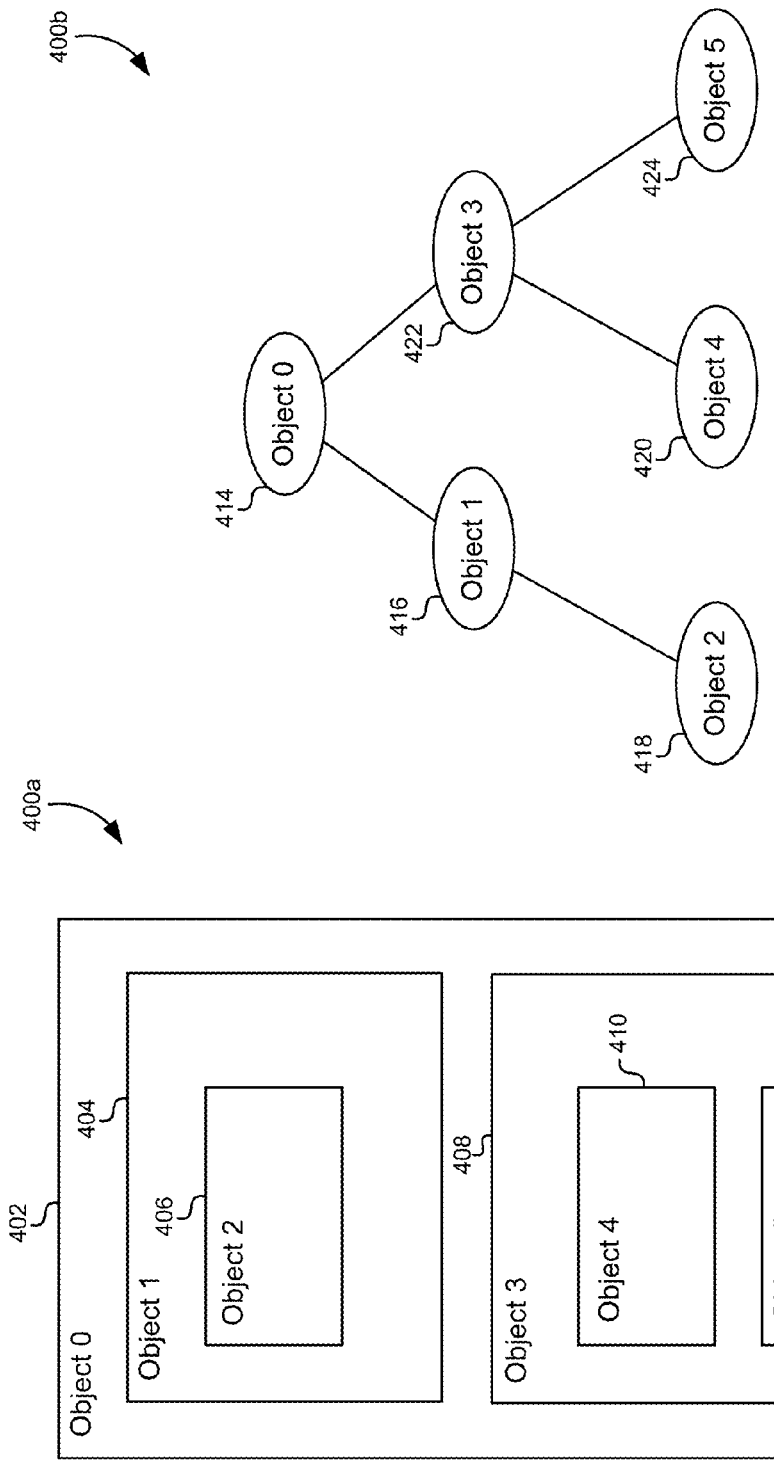
FIGS. 4A-4B illustrate representations of single-parent hierarchies, according to one embodiment.

In some embodiments, the client device 308 can provide a data set 306 to the web service interface 304 that is hierarchical in nature. Sometimes, the data set 306 may comprise a single-parent hierarchy. FIGS. 4A-4B illustrate representations of single-parent hierarchies, according to one embodiment. Note that these examples are merely exemplary, and are provided simply to enable one having skill in the art to recognize what is meant by a "single-parent hierarchy."

FIG. 4A illustrates a nested hierarchy 400a of data where child objects are encapsulated within the parent objects. For example, object 402 may be referred to as a base, root, or super parent object because each of the remaining objects descends from object 402. Specifically, object 404 and object 408 may be first-generation children of object 402. Object 406 may be a child of object 404, while object 410 and object 405 may be children of object 408. Note that each object can have at most one parent. In these types of data structures, it may not be possible to define an object as having multiple parents. For example, the nested hierarchy 400a may represent a hierarchy created by a schema, such as an XML schema document. Schemas are often created textually or graphically, and are not typically allowed to create multi-parent hierarchies based on syntax rules.

FIG. 4B illustrates a tree structure hierarchy 400b that may also be defined as a single-parent hierarchy. Each of the objects 414, 416, 418, 420, 422, and 424 are arranged in a hierarchy similar to the objects previously discussed in relation to FIG. 4A. For example, object 414 is the only parent of object 416, which in turn is the only parent of object 418. In this case, the tree structure hierarchy 400b may have rules enforced by syntax or code structure that allow only a single parent for each object.

These different representations of single-parent hierarchies have been discussed because they are often used to format and represent data sets that are provided between computer systems. Turning back briefly to FIG. 3, the client device 308 can provide a data set 306 to the web service interface 304 that is formatted using an XML document, using an XML schema, using a tree structure, and/or any other type of single-parent hierarchy. However, as will be illustrated below, data may be duplicated within the data set 306 in different nested levels of the single-parent hierarchy. When the data set 306 is received by the server 302, it may be desirable for the duplicated data to be represented with a single data record. Therefore, embodiments discussed herein provide a means for defining, detecting, processing, and storing multi-parent data that is transmitted in the form of a single-parent hierarchy.

Figure 5:
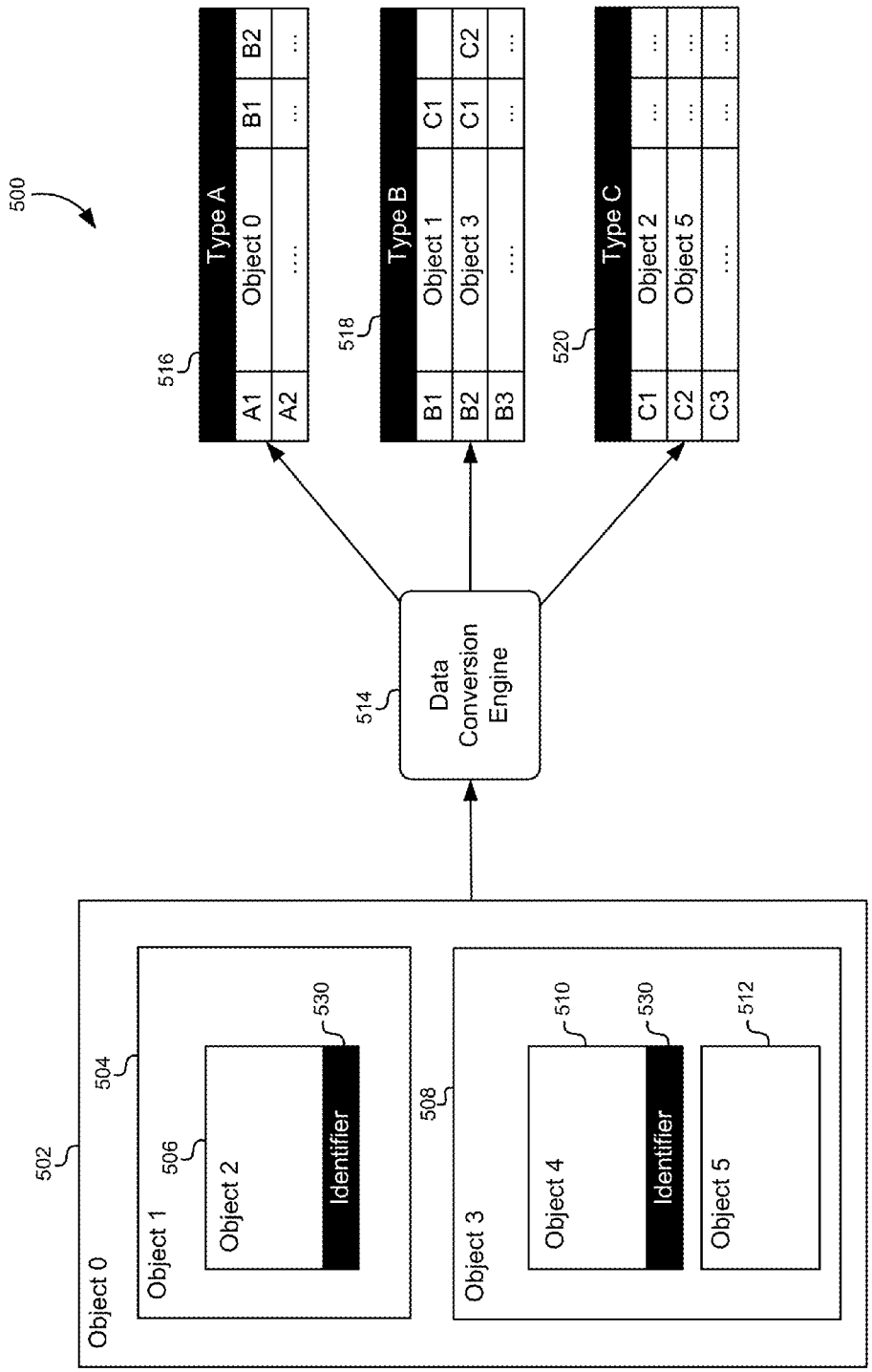
FIG. 5 illustrates the operation of a data conversion engine, according to one embodiment.

FIG. 5 illustrates the operation of a data conversion engine 514, according to one embodiment. The data conversion engine 514 may be implemented using any combination of hardware and/or software, along with any of the computer system components described above. The data conversion engine 514 may operate as a part of a web service interface, a server, and/or any other subsystem of a computer system receiving a data set.

In this embodiment, the data provided to the data conversion engine is in a single-parent format. For example, object 502 is the only parent of object 504 and object 508. Object 504 is the only parent of object 506. Object 508 is the only parent of object 510 and object 512. This single-parent hierarchy may be enforced by a data specification provided by a web service interface.

In this particular example, object 506 and object 510 may represent the same and/or similar data. However, in the single-parent hierarchy, the data encapsulated within object 506 and object 510 is duplicated within the single-parent hierarchy. In order to signify that the information represented by object 506 and object 510 is the same and/or similar, an identifier 530 may be included as a part of object 506 and object 510. In some embodiments, identifier 530 need not be an existing database foreign key in table 520, such as C1 and/or C2. Instead, identifier 530 may be a non-persistent, in-memory value having a life that is extinguished after the web service request is processed. This represents an upgrade over existing technologies that use database foreign key values. The identifier 530 may be any piece of information that can be identified by the data conversion engine 514. For example, the identifier 530 may include a flag, a data field, and attribute, a characteristic, a name, a label, metadata, a data format, a data value, an encryption key, a signature, and/or the like.

When receiving the single-parent hierarchy, the data conversion engine 514 can parse the various object definitions and create a data record for each data object. Data records may be implemented by entries in a database. Relational databases may represent a data hierarchy using foreign keys. A foreign key is a value within a database table entry that refers to another entry in in a different table. The database table entry that refers to the other entry may be considered the parent of the other entry.

In the example of FIG. 5, three tables within a relational database have been created. Note that the three tables illustrated by FIG. 5 include multiple foreign keys within some of the table entries. This is merely exemplary, and other representations may readily be used. For example, instead of using multiple foreign keys in a single entry, intersection tables could also be used to represent a multi-parent hierarchy in a database. Table 516 includes data records representing objects of type "A". Table 518 includes data records representing objects of type "B". Table 520 includes data records representing objects of type "C". The data record representing "Object 0" includes two foreign keys (B1 and B2) that reference data records representing "Object 1" and "Object 3" in a table 518. The data record representing "Object 1" includes a foreign key (C1) that references a data record representing "Object 2" in table 520. Similarly, the data record representing "Object 3" in table 518 includes two foreign keys (C1 and C2) that reference data records representing "Object 2" and "Object 5" in table 520.

Note that there is no data record corresponding directly to object 510 ("Object 4") in the original single-parent hierarchy. While parsing the single-parent hierarchy, the data conversion engine 514 can recognize the identifier 530. The data conversion engine 514 can then associate each of the objects that include the identifier 530, and thereby can ascertain that each of these objects represents the same and/or similar data.

Some embodiments allow for objects associated with the identifier 530 to be otherwise empty. Other embodiments allow for objects associated with the identifier 530 to include conflicting data definitions. Therefore, in some embodiments the data conversion engine 514 may use the data definition found in the first object that includes the identifier 530. Other objects that include the identifier 530 may have any existing data definition replaced by the first found definition. In another embodiment, if multiple objects associated with the identifier 530 include conflicting data definitions, then the data of each identified object may be concatenated or otherwise combined together.

For example, object 506 may represent an address for a person otherwise defined by a parent object. Object 510 may represent the same address. However, object 506 may omit a city designation, and object 510 may omit a ZIP code. In one embodiment, because both object 506 and object 510 include the identifier 530, the address definitions may be combined together such that the resulting data record includes both a city and a ZIP code. In another embodiment, the first data definition found (object 506) may be used exclusively, such that the resulting data record includes a ZIP code without a city. In another embodiment, an error message could be provided to the computer system providing the single-parent hierarchy informing a user or process that the data associated with the identifier 530 is not consistent throughout the hierarchy. In yet another embodiment, a voting scheme may be used to determine which of many conflicting objects associated with the identifier 530 is correct. For example, if there are four objects associated with the identifier 530, and three of the objects have similar data definitions, the remaining conflicting data definition may be discarded and replaced with the data definition from the other three agreeing objects.

After a single data definition is determined for all of the objects associated with the identifier 530, a single data record may be created to represent multiple objects. In the example of FIG. 5, the data definition of object 506 can be used to create a data record for "Object 2" in table 520. Both "Object 1" and "Object 3" in table 518 reference "Object 2" in table 520. Therefore, both "Object 1" and "Object 3" may be referred to as parents of "Object 2". Consequently, the data conversion engine 514 has taken single-parent data and transformed it into multi-parent data using the identifier 530.

There are a number of different ways that the data conversion engine 514 can transform single-parent data into multi-parent data. In one embodiment, the data conversion engine 514 can create an in-memory object representing the information encapsulated within object 506 and object 510. The in-memory object need only persist while the single-parent hierarchy is being analyzed. The in-memory object can then be turned into a data record, and the in-memory object can be discarded. Therefore, the in-memory object need not persist between data postings to a web service interface.

What follows is a particular example of object definitions in both a single-parent and a multi-parent environment. This particular example uses a data entry interface to provide a single-parent hierarchy of data to a web service interface. After receiving the single-parent hierarchy, a data conversion engine may create data records in a multi-parent hierarchy. This particular example also uses an XML format to represent data objects. Therefore, an XML "element" may be referred to interchangeably as an "object" for purposes of this example. The XML format may be converted to entries in a relational database tables after being received by the web service interface. Therefore, a database table entry may be referred to interchangeably as a "data record" for purposes of this example. It will be understood that the formats, data structures, and operations described in the example below are not meant to be limiting. Many other formats may be used depending on the particular embodiment, operating environment, and/or application.

Using the example of a web service interface, a client system may provide a data entry interface by which data may be entered and posted to a web service. FIG. 6 illustrates an interface 600 for receiving hierarchical data, according to one embodiment. In this particular example, the interface 600 can be used to register an organization with a web service and provide contact information as well as account information to the web service.

First, a user or representative of the organization may provide organization information 602 using interface 600. In one data field, a name for the organization may be entered, along with an address for the organization. A particular contact may be designated to represent the organization. Therefore, a user may also enter information for a contact person 604 using interface 600. Consequently, the user may provide a contact name as well the contact address.

Here, the address for the contact person may be the same as the address of the organization. The user may be given the opportunity to enter in the address manually, or may be provided with a drop down menu or other means of selecting a previously entered address. In this embodiment, a checkbox 610 is provided to indicate that the contact person address is the same as the organization address. Therefore, the interface 600 may provide a means by which a user can indicate that data should be duplicated within the data input. When organized as a single-parent hierarchy for delivery to the web service, duplicated data will often be parsed by the data conversion engine previously described to form multi-parent data records.

Continuing with this example, the user may enter account information to be associated with the organization using interface 600. In this case, the account number, an account name, and an account contact may be received. Again, a checkbox 612 is provided to indicate that the account contact is the same as the organization contact. In one embodiment, all or some of the child data of the organization contact can then be imported into an object representing the account information. Thus, both the contact name ("Alex Lifeson") and the organization address ("123 Peach St, Cupertino, Calif. 94606") may be duplicated within the object representing the account information.

A button 614 or other input may be provided that allows the user to submit all of the input information as a single data packet to the web service. The interface 600 can take all of the information and indications provided by the user and create a single-parent hierarchy representation of the data. In this particular example, a single-parent hierarchy may be represented using an XML structure. Note that in other embodiments, different structures, syntaxes, languages, and/or formats may be used to represent a single-parent hierarchy.

FIG. 7 illustrates an exemplary single-parent data representation, according to one embodiment. This particular single-parent data representation is provided in the form of an XML data file 700. The XML elements contained therein may be derived from the information provided in interface 600 of FIG. 6. Therefore, the contact information for "Alex Lifeson" is provided in two separate locations. Similarly, the address of the organization is provided in three separate places, namely as a child of the organization, as a child of the contact, and as a grandchild of the account.

In one embodiment, the interface 600 of FIG. 6 may extract the data from each of the data entry fields of the interface 600 and package the information in a data set using XML syntax. In one embodiment, the interface 600 may intelligently recognize duplicate data. This may be done by comparing each of the data fields, or alternatively may be accomplished using user provided indications, such as the check boxes 610, 612 provided by the interface 600 that indicate duplicate data.

Figure 8:
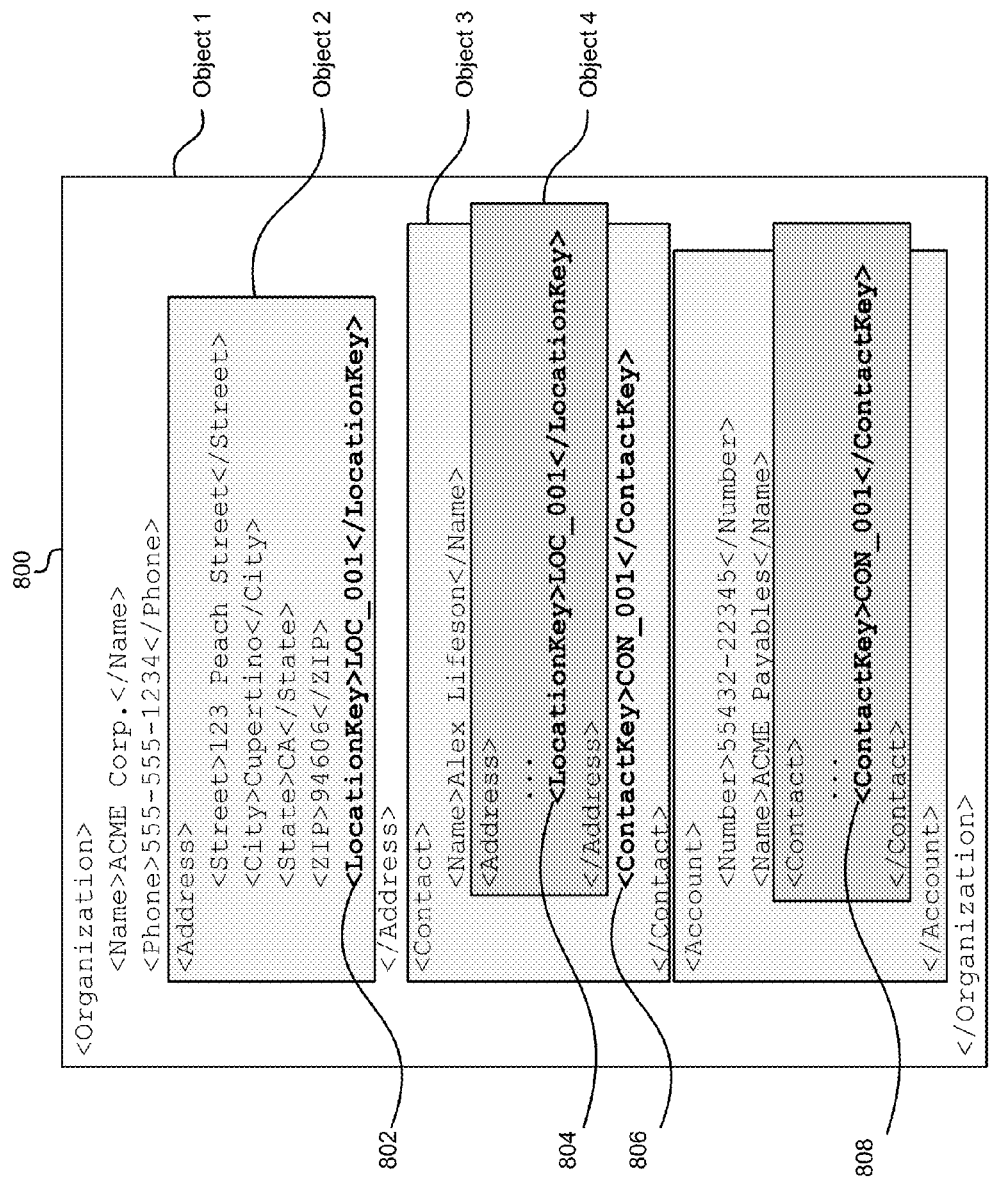
FIG. 8 illustrates a single-parent data representation including identifiers, according to one embodiment.

After recognizing duplicate data, the interface 600 may insert an indicator into each of the duplicate XML elements indicating that they represent the same and/or similar data. FIG. 8 illustrates a single-parent data representation including identifiers, according to one embodiment. In this example, an XML file 800 includes at least two different types of duplicate data. Therefore, the interface 600 may insert at least two different types of indicators. For example, a "<LocationKey>" indicator may be used to denote an address or location, while a "<ContactKey>" indicator may be used to denote a person or entity. Note that these indicators are merely exemplary, and any XML element could be used.

The indicators may be given a value that can be used to denote the same and/or similar data for each type. For example, "<LocationKey>" indicators 802, 804 may be used to indicate an address element representing the same physical location, e.g. the organization address. Similarly, "<ContactKey>" indicators may be used to indicate a contact element representing the same person, e.g. the organization contact and the account contact.

In one embodiment, the information provided to the interface 600 may be included within each element designated by an indicator. In another embodiment, the information provided to a representative one of the XML elements may be recorded, while the remaining XML elements that include the same indicator may be left empty. This may provide for a smaller data set, that can reduce transmission time through a network, as well as processing time at a server. For example, only the first definition of the addresses and contacts in the XML file of FIG. 8 that are associated with their respective identifiers may need to include definition information. For example, Only the first address element includes street, city, state, and zip code elements, and only the first contact element includes a name and address element. The address/contact elements that follow these initial definitions can be left empty aside from the identifier.

Figure 9:
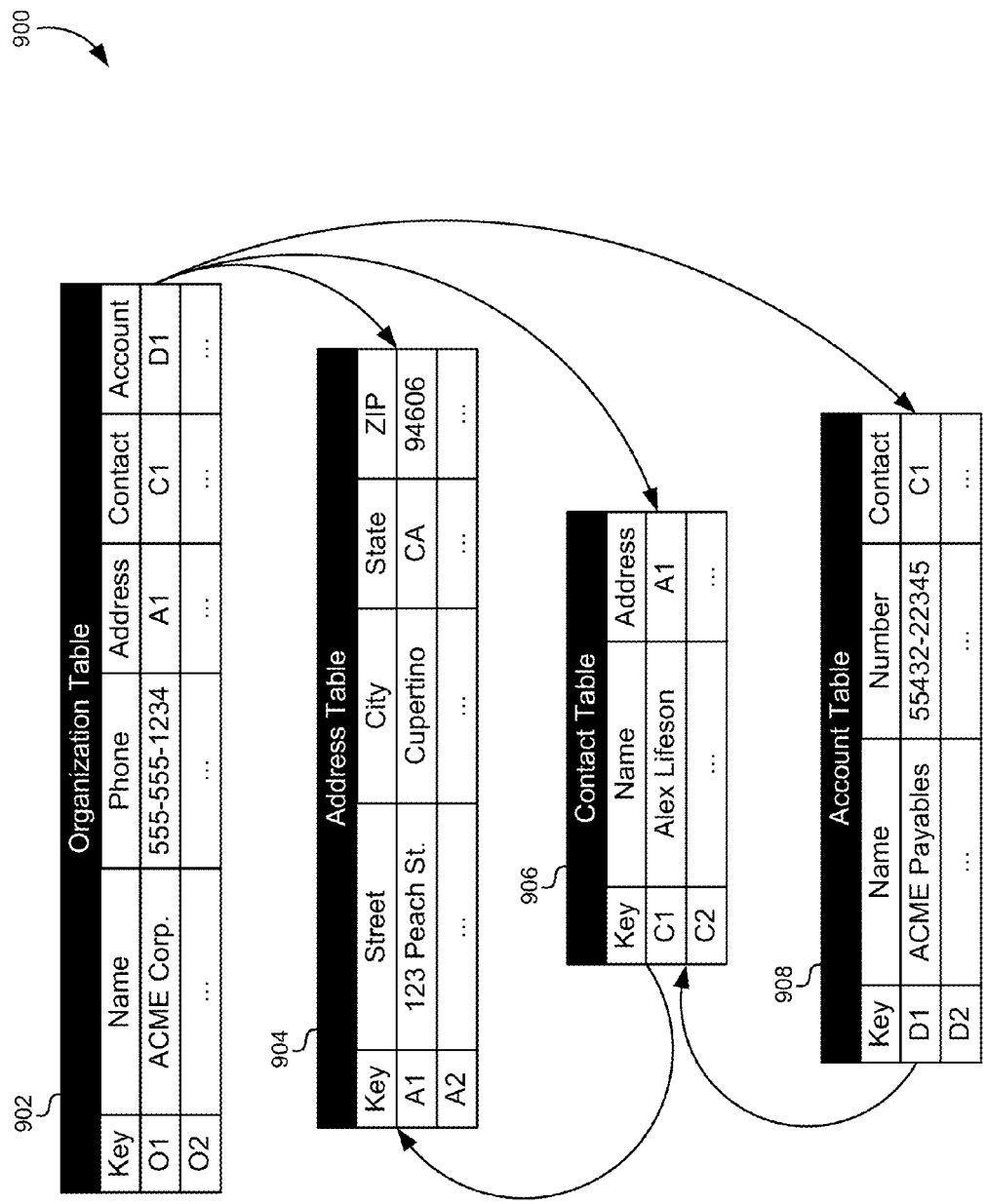
FIG. 9 illustrates a transformed multi-parent set of data records, according to one embodiment.

FIG. 9 illustrates a transformed multi-parent set of data records, according to one embodiment. After the XML file of FIG. 8 is received by a web service interface, a server may parse and process the XML file to create database table entries therefrom. In this example, the name and phone number of the "ACME Corp." can be included in a table entry for an organization table 902. As a part of this table entry, foreign keys may be used to point to child data records in other database tables for the address, contact, and account information.

Similarly, a contact record for "Alex Lifeson" may be added to a contact table 906, and an account name and number may be added to an account table 908. Note that both the data record in the contact table 906 and the data record in the account table 908 include a foreign key pointing to other data records. The arrows in FIG. 9 are used to illustrate the multi-parent representation of the data stored within the various database tables. For example, the entry in the contact table 906 is a child record of both the organization and the account. Similarly, the entry in the address table 904 is a child record of both the contact and the organization.

In one embodiment, a data conversion engine may operate on the receiving server to parse the XML file format and create database table entries. The data conversion engine may be configured to recognize a specific type of XML element that can be used as an identifier. For example, the data conversion engine may recognize the "<ContactKey>" element as an indicator for a contact. In one embodiment, each database table may be associated with a unique XML element that may be used as an indicator for duplicate data to be stored within that table.

It is worth noting what would happen to the data representation in the database without using indicators. If the XML file in FIG. 7 were simply parsed and each element were stored in a database table, the address table 904 would include three distinct entries, each of which would have the represent the same or similar information. Similarly, the contacts table 906 would include two entries for "Alex Lifeson". The foreign key in the organization table 902 pointing to an address would be different than the foreign key in the contact table 906 pointing to an address. Therefore, the single-parent representation of data found in the XML file would be translated into a single-parent representation of data in the database tables. In large databases that accept data entry from multiple sources, duplicated data may result in a loss of storage space and data dependencies that are not easily resolved.

Figure 10:
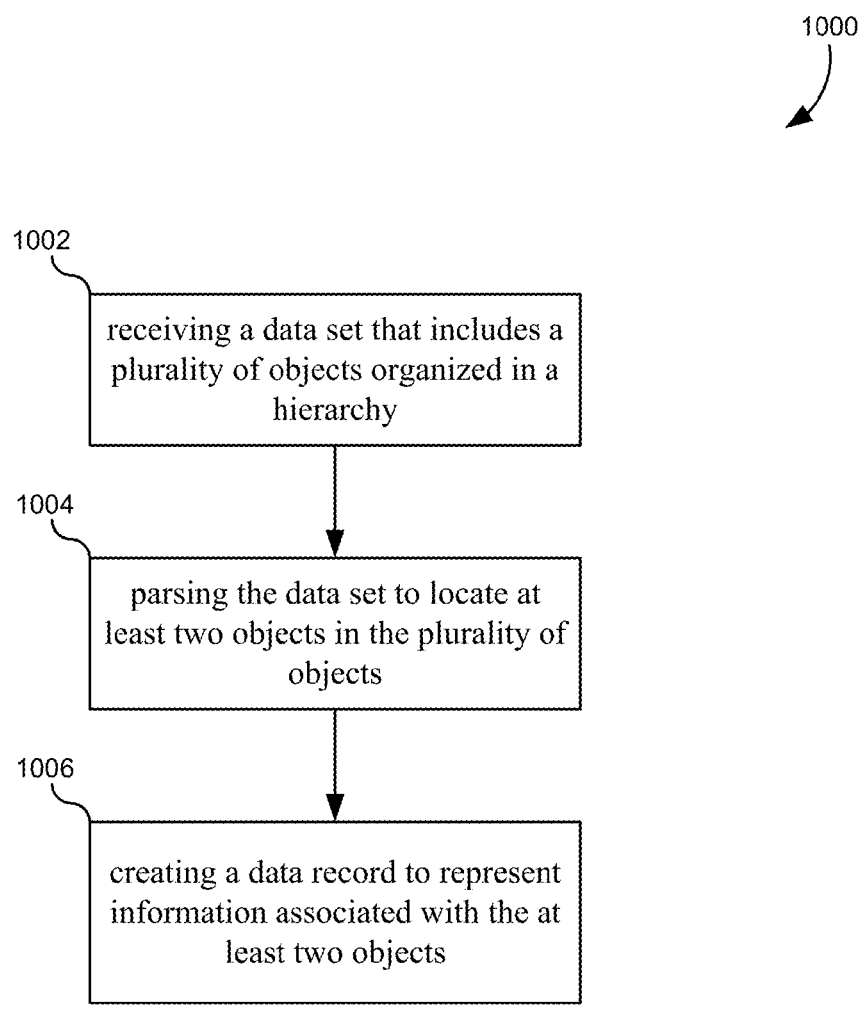
FIG. 10 illustrates a flowchart of a method of creating multi-parent relationships from single-parent hierarchies, according to one embodiment.

FIG. 10 illustrates a flowchart 1000 of a method of creating multi-parent relationships from single-parent hierarchies, according to one embodiment. The method may include receiving a data set that includes a plurality of objects organized in a hierarchy (1002). The data set may be received by a first computer system from a second computer system. The first computer system may comprise a server and/or a web service interface. The second computer system may comprise a client system. In one embodiment, the hierarchy may be a single-parent hierarchy. In one embodiment, the hierarchy may be capable of supporting multi-parent hierarchies, yet the data is organized is a single-parent hierarchy comprising duplicate data. The data set may be represented by an XML-formatted file.

The method may also include parsing the data set to locate at least two objects in the plurality of objects (1004). Each of the least two objects can be associated with an identifier. A data conversion engine can begin scanning an input file/stream that includes the data set until it finds what can be identified as an identifier. At that point, the data conversion engine can continue scanning the input file/stream until it discovers at least one more object associated with the same identifier. In one embodiment, the data conversion engine can scan the entire input file/stream to identify every object associated with the identifier. It will be understood that the data set can include different types of identifiers that can be used to group different classes of objects. In one embodiment, a same identifier tag may be used with different values to group different objects. For example, the XML tag <LocationKey> may be associated with two different values, such as "L00001" and "L00002", which can be interpreted as different identifiers.

The method may additionally include creating a data record to represent information associated with the at least two objects (1006). The information associated with the at least two objects may comprise a composite set of information extracted from one or more of the at least two objects. All of the information may come from one object, and may thus exclude any information represented by any of the other objects. Alternatively, the information may represent an intersection of information represented by the individual objects or, the information may represent a union of information represented by the individual objects.

The data record may have multiple parent data records. The multiple parent data records may be associated with parent objects of each of the at least two objects. Like the information represented by the data record, the multiple parent data records may comprise a union, an intersection, or any other type of combination of parent objects associated with the at least two objects.

Figure 11:
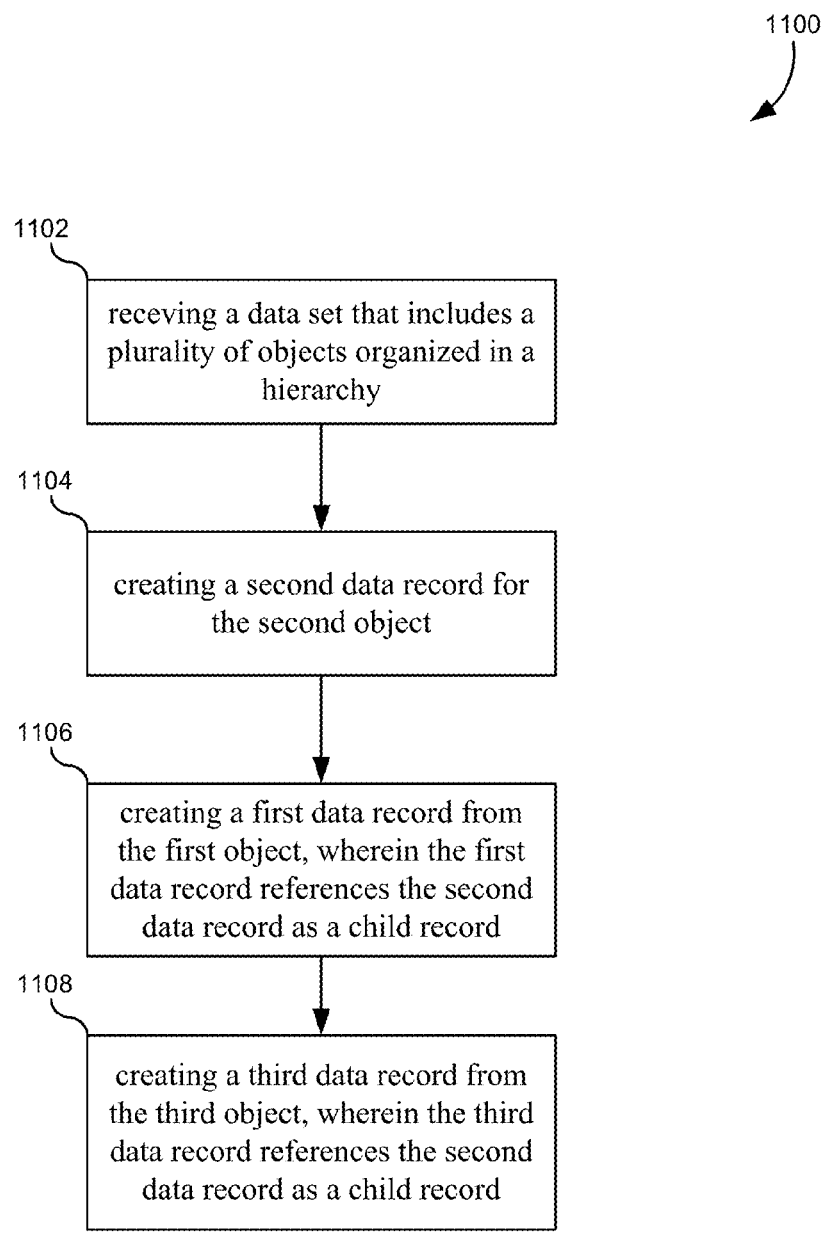
FIG. 11 illustrates a flowchart of another method of creating multi-parent relationships from single-parent hierarchies, according to one embodiment.

FIG. 11 illustrates a flowchart 1100 of another method of creating multi-parent relationships from single-parent hierarchies, according to one embodiment. The method may include receiving a data set that includes a plurality of objects organized in a hierarchy (1102). The data set may be received by a first computer system from a second computer system. The first computer system may comprise a server and/or a web service interface. The second computer system may comprise a client system. In one embodiment, the hierarchy may be a single-parent hierarchy. In one embodiment, the hierarchy may be capable of supporting multi-parent hierarchies, yet the data is organized is a single-parent hierarchy comprising duplicate data.

The data set may include a first object and the second object. The second object may be associated with an identifier and may also be the child of the first object according to the hierarchy. The data set may also include a third object and a fourth object. The fourth object may also be associated with the identifier, and the fourth object may be a child of the third object according to the hierarchy. In one embodiment, the fourth object need not include a data definition. The fourth object may be empty except for the identifier. The fourth object may also include a data definition that is different from the second object. The fourth object may also include a data definition that is the same as the second object. In some embodiments, the data set may represent a payload being transmitted between a client device and a web service interface. In some embodiments, the data set may be organized according to an XML format, and may comprise an XML file.

In one embodiment, the identifier may comprise an XML element. The identifier may comprise an attribute/value pair, such as an XML element and an enclosed value. The identifier may also comprise an attribute. In another embodiment, metadata associated with the data set may include the identifier associations.

The method may also include ascertaining, based on the identifier, that the second object and the fourth object represent the same information (not shown). Ascertaining that these objects represent the same information may be accomplished by matching the data instances that have a common identifier. Note that the second object and the fourth object can represent the same information, yet still include different data definitions. In the example used above, an address associated with the second object may exclude a city, while an address associated with the fourth object may exclude a ZIP code. In another example, both addresses could be completely different. In this case, the data conversion engine can select one of the two objects (addresses) to use for both objects in a corresponding data record.

The method may further include creating a second data record for the second data object (1104). In one embodiment, the second data record may comprise an entry in a table in a relational database. The relational database may include references to other tables, entries, and/or databases. The second data record may be based on information associated with the second object in the hierarchy.

The method may additionally include creating a first data record from the first object (1106). In one embodiment, the first data record may reference the second data record as a child record. This reference may be implemented using a foreign key in a table in a relational database that references another table, entry, and/or database.

Additionally, the method may include creating a third data record from the third object (1108). In one embodiment, the third data record may also reference the second data record as a child record. In some embodiments, the fourth object in the hierarchy need not have a corresponding data record created. Instead, the third data record may reference the second data record as a child because both the second object and the fourth object in were associated with the identifier. In some embodiments, the identifier may be associated with an in-memory object that need not persist between hierarchical data sets that are received. In some embodiments, the data conversion engine may prevent a fourth data record from being created from the fourth object.

It should be appreciated that the specific steps illustrated in FIG. 11 provide particular methods of converting data sets according to various embodiments of the present invention. Other sequences of steps may also be performed according to alternative embodiments. For example, alternative embodiments of the present invention may perform the steps outlined above in a different order. Moreover, the individual steps illustrated in FIG. 11 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 12:
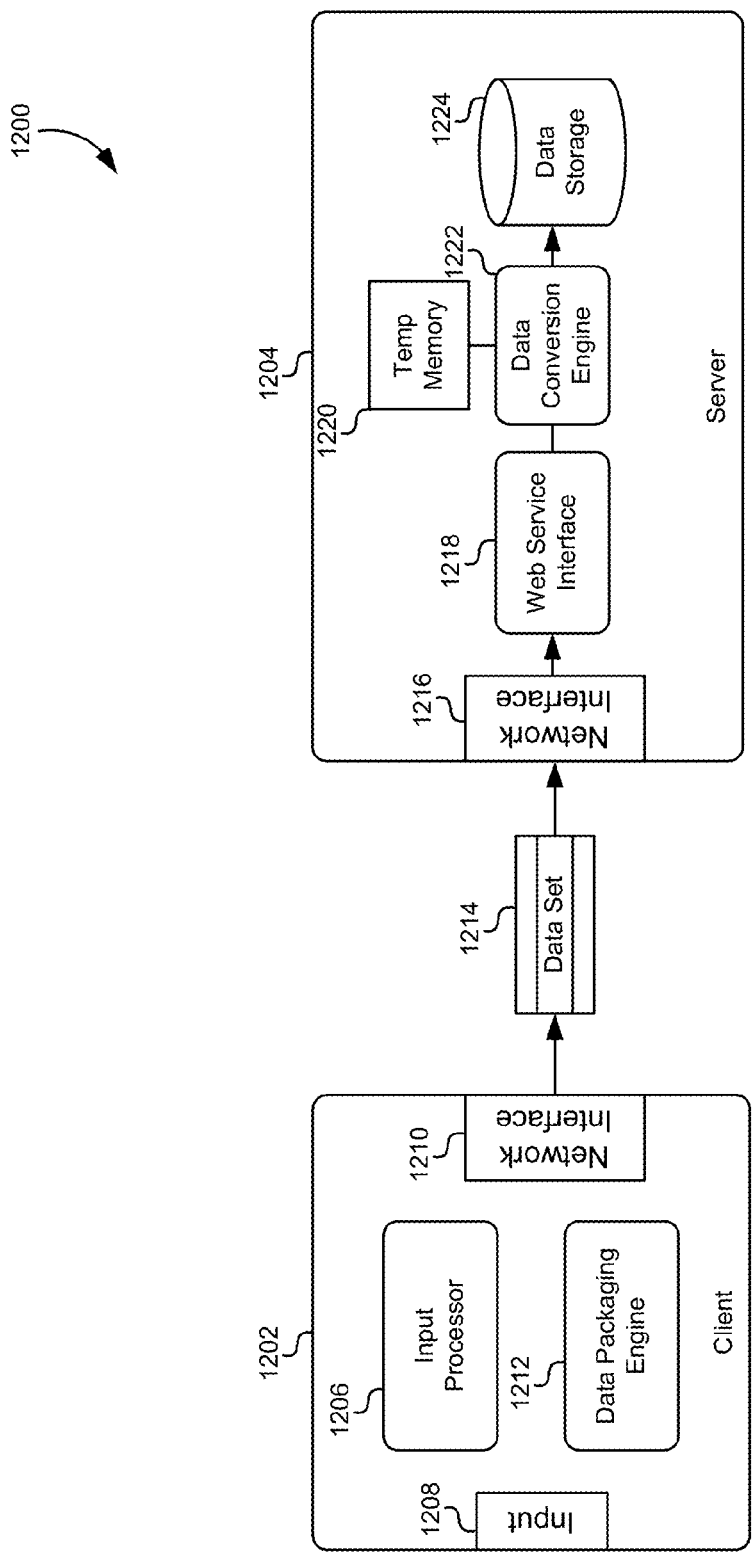
FIG. 12 illustrates a block diagram of a system for transforming data hierarchies, according to one embodiment.

Each of the methods, systems, and/or products disclosed herein may be implemented in a general purpose computer system, such as computer system 200 in FIG. 2. Alternatively, each of the methods, systems, and/or products disclosed herein may also be implemented using dedicated hardware and/or software. In one embodiment, both the first computer system and the second computer system that receive and send data sets may each be implemented using dedicated hardware comprised of digital and analog electronic circuits that are known in the art. FIG. 12 illustrates a block diagram 1200 of a system for transforming data hierarchies, according to one embodiment. Each of the modules depicted in FIG. 12 may be implemented using physical hardware that may or may not include general purpose processors. An exhaustive list of the transistor, diodes, memory elements, and/or other digital.analog circuit elements that could be used to implement these functions would be well known to one having skill in the art.

A client device 1202 may include an input port 1208 that is configured to receive an input from a user or from another computer process. The input port 1208 may be implemented using a wireless interface or a mechanical connection to a network. The client device 1202 may include an input processor 1206 that is configured to process an input from a user. The input processor 1206 may be incremented using digital circuitry and may cause the display device to present a user interface through which input prompts can be provided.

The client device 1202 may also include a data packaging engine 1212 that is configured to receive inputs from the input processor 1206 and package them into a single-parent hierarchy that may include duplicate data. In one embodiment, the data packaging engine 1212 may automatically parse the input data and replace and/or augment duplicate data with an identifier signifying multi-parent relationships that are not implemented in the single-parent hierarchy. The data packaging engine 1212 can provide a data set 1214 to a network interface 1210. The network interface 1210 may be connected to a network via a wireless or wired connection.

At another endpoint of the network, a server 1204 may also be equipped with a second network interface 1216 and communicatively coupled to the network interface 1210 of the client device 1202. Through the second network interface 1216, the data set 1214 may be received and sent to a web service interface 1218. The web service interface may be configured to present a standard interface for interacting with client devices. The web service interface may specify the format of the data set 1214. The web service interface 1218 can send the data set 1214 to a data conversion engine 1222. The data conversion engine 1222 can parse the data set using a microprocessor, microcontroller, and/or the like.

A temporary memory 1220 may be used to store intermediate data, such as information associated with an identifier, referred to elsewhere herein as an in-memory object. The temporary memory 1220 may be implemented using any hardware device such as a RAM, a ROM, a flash memory, an EEPROM, and/or any other physical memory device. The data conversion engine 1222 can create individual data records for objects found in the data set 1214 and can send the data records to a data storage database 1224 that is configured to store the types of information embodied by the data set 1214.

It will be understood that this hardware implementation illustrated by FIG. 12 is merely exemplary. Other types of hardware devices can be used to implement a specialized data processing system as described in this disclosure.

In one embodiment, the various modules and systems in FIG. 12 may reside on separate computer systems. Alternatively, multiple modules may be combined on the same or similar computer systems. In addition, some modules may be combined together into a single module performing the functions of both individual modules. Similarly, a single module may be split into multiple modules. It will be understood in light of this disclosure that any arrangement of the modules, as well as any implementation in both software and hardware, may be used by various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of creating multi-parent relationships from single-parent data, the method comprising:
    receiving a data set that includes a plurality of objects organized in a hierarchy, the plurality of objects comprising:
        a first object;
        a second object that is associated with an identifier and is a child of the first object according to the hierarchy;
        a third object; and
        a fourth object that is associated with the identifier and is a child of the third object according to the hierarchy;
    ascertaining, based on the identifier, that the second object and the fourth object represent the same information;
    creating a second data record from the second object;
    creating a first data record from the first object, wherein the first data record references the second data record as a child record; and
    creating a third data record from the third object, wherein the third data record references the second data record as a child record.

2. The method of claim 1 further comprising:
    discarding the fourth object without requiring a corresponding fourth data record to be created.

3. The method of claim 2 wherein information represented by the second object is different than information represented by the fourth object.

4. The method of claim 3 wherein the information represented by the fourth object is empty.

5. The method of claim 1 wherein the hierarchy comprises a single-parent hierarchy.

6. The method of claim 1 wherein:
    the first data record, the second data record, and the third data record are part of a plurality of data records created from the plurality of objects; and
    the plurality of data records is arranged in a multi-parent hierarchy.

7. The method of claim 3 wherein the data set comprises an XML format.

8. The method of claim 7 wherein the identifier comprises a value associated with an XML element.

9. The method of claim 4 wherein:
the first data record, the second data record, and the third data record are part of a plurality of data records created from the plurality of objects; and
each of the plurality of data records comprises an entry in one or more relational databases.

10. The method of claim 5 wherein:
the data set is received by an application that is a part of a suite of Enterprise Software Suite (ESS) applications;
the data set is sent from a client system that is part of the ESS; and
the ESS comprises a financial application, a human resource application, and an access manager.

11. The method of claim 6 wherein the second data record is referenced by a foreign key in the first data record and the second data record.

12. The method of claim 1 wherein the data set comprises:
information related to an organization,
contact information,
account information, and
an address.

13. A non-transitory computer-readable memory comprising instructions that, when executed by one or more processors, cause the one or more processors to perform operations comprising:
receiving a data set that includes a plurality of objects organized in a hierarchy, the plurality of objects comprising:
a first object;
a second object that is associated with an identifier and is a child of the first object according to the hierarchy;
a third object; and
a fourth object that is associated with the identifier and is a child of the third object according to the hierarchy;
ascertaining, based on the identifier, that the second object and the fourth object represent the same information;
creating a second data record from the second object;
creating a first data record from the first object, wherein the first data record references the second data record as a child record; and
creating a third data record from the third object, wherein the third data record references the second data record as a child record.

14. The non-transitory computer-readable memory according to claim 13, wherein the hierarchy comprises a single-parent hierarchy.

15. The non-transitory computer-readable memory according to claim 13, wherein:
the first data record, the second data record, and the third data record are part of a plurality of data records created from the plurality of objects; and
the plurality of data records is arranged in a multi-parent hierarchy.

16. A system comprising:
one or more processors; and
one or more memories comprising instructions that, when executed by the one or more processors, cause the one or more processors to perform operations comprising:
receiving a data set that includes a plurality of objects organized in a hierarchy, the plurality of objects comprising:
a first object;
a second object that is associated with an identifier and is a child of the first object according to the hierarchy;
a third object; and
a fourth object that is associated with the identifier and is a child of the third object according to the hierarchy;
ascertaining, based on the identifier, that the second object and the fourth object represent the same information;
creating a second data record from the second object;
creating a first data record from the first object, wherein the first data record references the second data record as a child record; and
creating a third data record from the third object, wherein the third data record references the second data record as a child record.

17. The system of claim 16 wherein the hierarchy comprises a single-parent hierarchy.

18. The non-transitory computer-readable memory of claim 13 further comprising additional instruction that, when executed by the one or more processors, cause the one or more processors to perform additional operations comprising:
discarding the fourth object without requiring a corresponding fourth data record to be created.

19. The non-transitory computer-readable memory of claim 13 wherein:
the first data record, the second data record, and the third data record are part of a plurality of data records created from the plurality of objects; and
each of the plurality of data records comprises an entry in one or more relational databases.

20. The non-transitory computer-readable memory of claim 13 wherein the second data record is referenced by a foreign key in the first data record and the second data record.

* * * * *